(12) United States Patent
Drozt et al.

(10) Patent No.: US 6,904,285 B2
(45) Date of Patent: **\*Jun. 7, 2005**

(54) METHOD AND APPARATUS FOR INTERURBAN DISPATCH PRIVATE CALLING

(75) Inventors: Peter M. Drozt, Prairie Grove, IL (US); Steven E. VanSwol, Lombard, IL (US); Arthur J. Brennan, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 340 days.

This patent is subject to a terminal disclaimer.

(21) Appl. No.: 10/177,948

(22) Filed: Jun. 21, 2002

(65) Prior Publication Data

US 2003/0236093 A1 Dec. 25, 2003

(51) Int. Cl.[7] ................................................ H04Q 7/20
(52) U.S. Cl. ........................ 455/450; 455/508; 455/509; 455/516; 455/517; 455/520; 455/521
(58) Field of Search ................................ 455/403, 404.1, 455/417, 424–425, 426.1, 426.2, 435.1, 435.2, 456.2, 456.5, 550.1, 552.1, 554.2, 445, 446, 450, 451, 458, 459, 461, 462, 463, 507, 508, 515–521, 533.1, 560

(56) References Cited

U.S. PATENT DOCUMENTS

| | | | | |
|---|---|---|---|---|
| 5,689,810 A | | 11/1997 | Shaughnessy et al. | |
| 5,724,648 A | | 3/1998 | Shaughnessy et al. | |
| 5,835,485 A | * | 11/1998 | Grube et al. | 370/312 |
| 5,987,331 A | * | 11/1999 | Grube et al. | 455/509 |
| 6,097,963 A | * | 8/2000 | Boltz et al. | 455/518 |
| 6,330,454 B1 | * | 12/2001 | Verdonk | 455/456.2 |
| 6,343,115 B1 | * | 1/2002 | Foladare et al. | 379/88.17 |
| 6,445,915 B1 | * | 9/2002 | Baiyor et al. | 455/416 |
| 6,564,049 B1 | * | 5/2003 | Dailey | 455/416 |
| 6,577,874 B1 | * | 6/2003 | Dailey | 455/521 |
| 6,640,109 B1 | * | 10/2003 | Drozt et al. | 455/508 |
| 2003/0154249 A1 | * | 8/2003 | Crockett et al. | 709/204 |

* cited by examiner

Primary Examiner—William Trost
Assistant Examiner—Meless Zewdu
(74) Attorney, Agent, or Firm—Jeffrey K. Jacobs

(57) ABSTRACT

To address the need to provide interurban dispatch services, embodiments supporting interurban dispatch private call and dispatch call alert services are disclosed. Call control in the local network equipment (110–131) manages the dispatch service in both the local urban area (101) and the remote urban area (151). Call flow embodiments that enable this local management of private call and call alert services across urban area boundaries are described in detail.

23 Claims, 2 Drawing Sheets

METHOD AND APPARATUS FOR INTERURBAN DISPATCH PRIVATE CALLING

CROSS-REFERENCE TO RELATED APPLICATION

This application is related to a co-pending application entitled "METHOD AND APPARATUS FOR INTERURBAN DISPATCH GROUP CALLING," filed on even date herewith, assigned to the assignee of the instant application, and hereby incorporated by reference.

FIELD OF THE INVENTION

The present invention relates generally to communication systems and, in particular, to interurban dispatch communication systems.

BACKGROUND OF THE INVENTION

Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call. A dispatch group call is ideal for a team of people who are working together as a group and often need to speak with one another spontaneously.

Likewise, the dispatch individual call service (typically a private call or a call alert) enables a user to communicate with another user quickly and spontaneously. This feature is ideal for two people who are working together but are unable to speak with one another directly. Where a wireless telephone call is more appropriate for a conversation, short messages between two people as they work are better facilitated by the dispatch individual call service.

Today, Motorola's "iDEN" system provides such dispatch services, but only within limited service areas called urban areas. Thus, an "iDEN" user is currently able to make dispatch group calls and dispatch private calls to other users located in the same urban area. However, when one of these users leaves the urban area (travels to another city, for example) and registers in a new urban area, dispatch services with those in the old urban area are no longer available.

Therefore, a need exists for a method and apparatus to provide interurban dispatch services.

DETAILED DESCRIPTION OF EMBODIMENTS

To address the need to provide interurban dispatch services, embodiments supporting interurban dispatch private call and dispatch call alert services are disclosed. Call control in the local network equipment manages the dispatch service in both the local urban area and the remote urban area. Call flow embodiments that enable this local management of private call and call alert services across urban area boundaries are described in detail.

Figure 1:
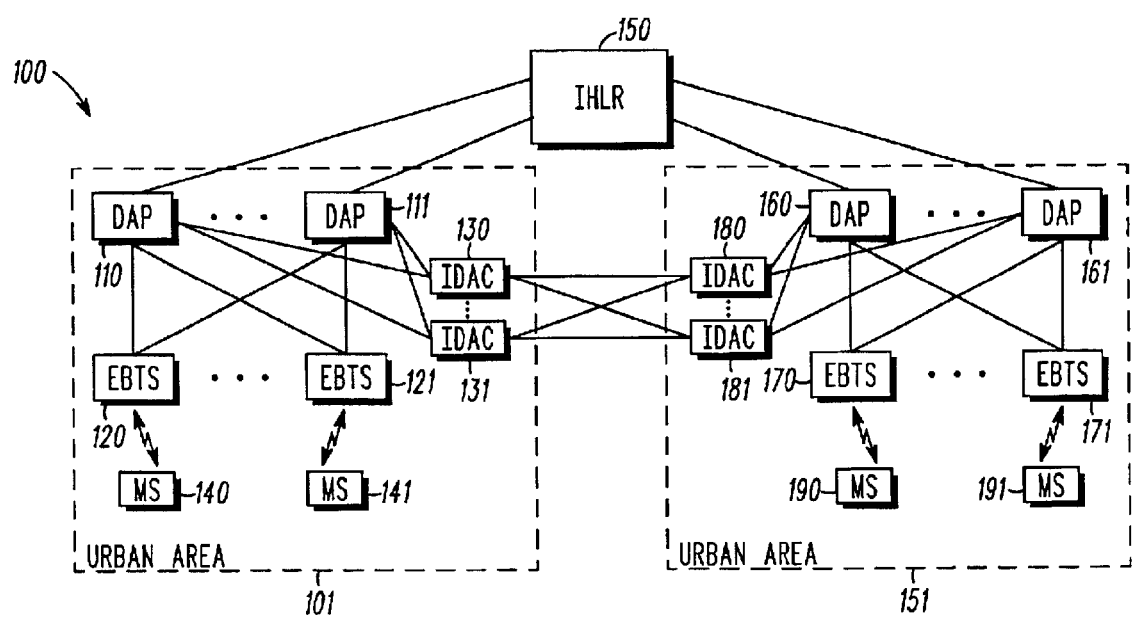
FIG. 1 is a block diagram depiction of a communication system in accordance with an embodiment of the present invention.
Figure 2:
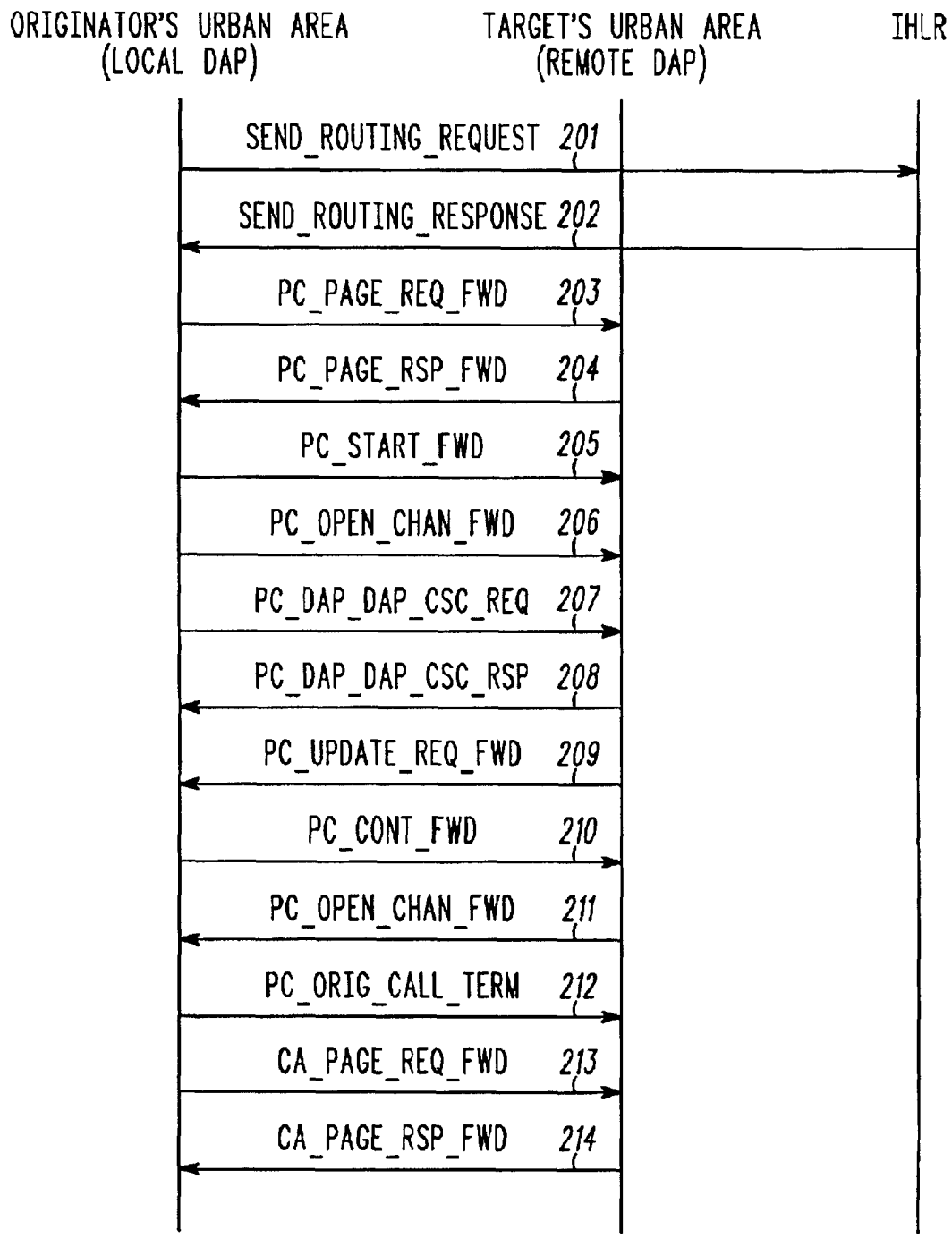
FIG. 2 is a call flow chart illustrating messaging exchanged by system components in accordance with an embodiment of the present invention.

The disclosed embodiments can be more fully understood with reference to FIGS. 1 and 2. FIG. 1 is a block diagram depiction of a communication system 100 in accordance with an embodiment of the present invention. System 100 comprises an "iDEN" communication system, commercially available from Motorola, Inc. of Schaumburg, Illinois, divided into constituent urban areas. Although urban areas 101 and 151 are depicted in FIG. 1, the person of skill in the art will recognize that system 100 may embody additional urban areas. Although urban areas typically refer to "iDEN" systems that provide service to distinct geographical regions, the person of skill will also recognize that an urban area may refer to another type of system (or non-iDEN device) that interfaces with an otherwise "iDEN" system by supporting an interurban interface.

System 100 comprises "iDEN" dispatch application processors (DAPs) 110, 111, 160, and 161, which serve as dispatch controllers, and interface to "iDEN" home location register (IHLR) 150. The DAPs also interface with the base sites, i.e., the "iDEN" enhanced base transceiver systems (EBTSs) 120, 121, 170, and 171. As depicted in FIG. 1, EBTSs 120, 121, 170, and 171 provide wireless service to mobile stations 140, 141, 190, and 191, respectively. However, the present invention is not limited to communication units that are mobile. For example, a communication unit may comprise a computer wirelessly connected to system 100 or a computer connected to system 100 via the Internet. DAPs 110, 111, 160, and 161 also interface with "iDEN" Dispatch Access Controllers (IDACs) 130, 131, 180, and 181, which provide system 100's interurban bearer connections between urban area 101 and urban area 151.

Those skilled in the art will recognize that FIG. 1 does not depict all of the network equipment and equipment components necessary for system 100 to operate. FIG. 1 only depicts a simplified diagram of those system entities particularly relevant to the description of embodiments of the present invention. For example, DAPs 110, 111, 160, and 161 are each dispatch controllers, which comprise a network transceiver and a processor, both well-known entities. Those skilled in the art are aware of the many ways each of these entities can be implemented and/or purchased from wireless communications companies such as "MOTOROLA." Processors, for example, typically comprise components such as microprocessors, memory, and/or logic circuitry designed to implement algorithms that have been expressed as computer instructions and/or in circuitry. Furthermore, processors are known to interface with network transceivers in order to communicate with other devices via data communication networks and/or dedicated communication links. Given an algorithm, a logic flow, or a messaging flow, those skilled in the art are aware of the many design and development techniques available to implement a processor that performs the specified logic and communicates via a network transceiver as required. Moreover, those skilled in the art will recognize that the dispatch controller aspect of the present invention may be implemented in and across various physical components of system 100, not just in the DAPs.

Operation of system 100, in accordance with an embodiment of the present invention, occurs substantially as follows with reference to FIGS. 1 and 2. FIG. 2 is a call flow chart illustrating messaging exchanged by system components in accordance with the present embodiment. Assume that the user of MS 140 desires to talk with the user of MS 190 using the dispatch private call service. MS 140 transmits a service request to its serving site, EBTS 120, which routes the service request to DAP 110. In one embodiment of the present invention, DAP 110 is designated as the serving DAP for MS 140. Such a pre-determined mapping of communication units to particular communication controllers is but one way of architecting interurban call processing. Certainly other schemes may be employed instead, such as selecting a controller in real-time based on load balancing considerations, for example.

The dispatch private call request received by the local network equipment targets a communication unit served by remote network equipment, i.e., MS 190. In the present embodiment, DAP 110 sends (201) a SEND_ROUTING_REQUEST message to IHLR 150 to determine what remote network equipment serves target unit MS 190. To support interurban dispatch services between local and remote network equipment, the local dispatch controller coordinates with the appropriate remote dispatch controller to manage the dispatch service. Although the present embodiment accesses a home location register, other embodiments may involve accessing other types of databases or caches that contain mobility information. MS 190 is identified in the SEND_ROUTING_REQUEST message using an identifier such as its Universal Fleet Member Identifier (UFMI).

DAP 110 receives (202) a SEND_ROUTING_RESPONSE message from IHLR 150 that identifies the remote network equipment serving MS 190. It is the network equipment of urban area 151 that serves MS 190, but in the present embodiment, the SEND_ROUTING_RESPONSE message indicates which particular DAP is the serving DAP of MS 190 (e.g., DAP 160).

DAP 110 requests the remote network equipment to page MS 190, by sending (203) DAP 160 a PC_PAGE_REQ_FWD message. In the present embodiment, the PC_PAGE_REQ_FWD message also identifies a bearer gateway in urban area 101 to support the dispatch private call. After receiving the PC_PAGE_REQ_FWD message, DAP 160 pages MS 190. When MS 190 responds to the page, DAP 160 sends (204) a PC_PAGE_RSP_FWD message to DAP 110 indicating that MS 190 responded and that channel resources required to support the dispatch private call are available in urban area 151, specifically identifying a bearer gateway to support the call. Other implementations may not require MS 190 to be explicitly paged, allowing DAP 160 to respond immediately. Also, if a resource is currently unavailable, the call may be queued and additional messaging necessary when the resource becomes available.

Having received a PC_PAGE_RSP_FWD message indicating that MS 190 and channel resources are available for the call, DAP 110 sends (205) a PC_START_FORWARD message requesting DAP 160 to initialize the channel resources to support the dispatch private call. Thus, both DAP 110 and DAP 160 prepare for transmission of the call. Once call setup is complete, e.g., the requisite wireless and interurban channels initialized, the private call transmission from MS 140 to MS 190 is performed.

When MS 140 finishes transmitting, thereby completing the first transmit session of the call, DAP 110 receives an end-of-transmission indication and sends (206) a PC_OPEN_CHAN_FWD message to DAP 160, indicating that MS 140 is finished transmitting. Upon receiving the PC_OPEN_CHAN_FWD message, DAP 160 notifies MS 190 that MS 140 has completed the transmit session.

During calls in the present embodiment, the local network equipment performs call status checking to ensure that the local network equipment and remote network equipment remain synchronized with respect to call states. A PC_DAP_DAP_CSC_REQ message is sent upon a timer expiration (e.g., 45 seconds), and thus, may be sent during various phases of a call. For example, FIG. 2 depicts a PC_DAP_DAP_CSC_REQ message being sent (207) after MS 140 has completed its transmit session; however, a PC_DAP_DAP_CSC_REQ message may be sent whenever a call status timer expires. The PC_DAP_DAP_CSC_REQ message indicates the present state of the call according to DAP 110. Possible call states include "Waiting for Resources," "Paging Target," "Pre-Call Start," "Originator Transmitting," "Hang Time," and "Target Transmitting".

DAP 160 receives the PC_DAP_DAP_CSC_REQ message and compares the message call state to its determination of the call state. If the received call state is not validated based upon DAP 160's current state, DAP 160 proceeds to teardown the call and sends an indication to DAP 110 to terminate the call. Otherwise DAP 160 responds (208) to the PC_DAP_DAP_CSC_REQ message with a PC_DAP_DAP_CSC_RSP message to DAP 110 indicating that the call states are synchronized.

Since MS 140 has completed its first transmit session, the private call is presently without a talker. For the sake of illustration, assume that the user of MS 190 desires to talk. The user depresses MS 190's push-to-talk button, and DAP 160, after receiving a request to talk from MS 190, sends (209) a PC_UPDATE_REQUEST_FWD message to DAP 110 indicating MS 190's request to talk. DAP 110 receives the PC_UPDATE_REQUEST_FWD message and determines whether talk privileges remain unassigned. (It is possible that MS 140 has requested to talk again, and DAP 110 has already granted talk privileges to MS 140.) If not already granted, DAP 110 sends (210) a PC_CONT_FWD message to DAP 160 indicating that MS 190 is granted talk privileges for a transmit session. Upon receiving the PC_CONT_FWD message, DAP 160 notifies MS 190 of its turn to transmit.

When MS 190 finishes transmitting, thereby completing the second transmit session of the call, DAP 160 receives an end-of-transmission indication and sends (211) a PC_OPEN_CHAN_FWD message to DAP 110, indicating that MS 190 is finished transmitting. Upon receiving the PC_OPEN_CHAN_FWD message, DAP 110 notifies MS 140 that MS 190 has completed the transmit session. At this point, either MS 140 or MS 190 can request to become the next transmitter. If neither MS 140 nor MS 190 requests to talk for a pre-determined period of time (the "hang time" as it is referred to in dispatch), DAP 110 will send (212) a PC_ORIG_CALL_TERM message indicating to DAP 160 to terminate the call.

Instead of or in addition to using a dispatch private call service to contact another communication unit, users may use a dispatch call alert service or a status message service. For example, using a call alert service, a user may page another communication unit to request a call back from that unit's user at a later time. DAP 110 might receive a call alert request from MS 140 targeting MS 190. DAP 110 would then send (213) a CA_PAGE_REQ_FWD message to DAP 160 requesting it to page MS 190 with a call alert from MS 140. As discussed above with respect to 201 and 202, IHLR 150 may need to be contacted to determine the location of the target. After receiving the CA_PAGE_REQ_FWD message, DAP 160 pages MS 190 identifying MS 140 as the requesting unit. When MS 190 responds to the page, DAP 160 sends (214) a CA_PAGE_RSP_FWD message to DAP 110 indicating that MS 190 responded.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A communication controller comprising:

a network transceiver; and a processor adapted to receive, using the network transceiver, a service request targeting a communication unit served by remote network equipment, wherein the service request is received from an originating unit served by the communication controller, adapted to send, using the network transceiver, a request for the remote network equipment to page the communication unit, adapted to receive, from the remote network equipment using the network transceiver, an indication that the communication unit is available, adapted to send, using the network transceiver, a request for the remote network equipment to initialize channel resources to support the service request, adapted to receive, using the network transceiver, an indication that the originating unit has completed a transmit session, adapted to send, to the remote network equipment using the network transceiver, an indication that the originating unit has completed the transmit session, adapted to receive, from the remote network equipment using the network transceiver, an indication that the communication unit has requested to talk, adapted to send, to the remote network equipment using the network transceiver, an indication that the communication unit is granted talk privileges for a transmit session, and adapted to receive, from the remote network equipment using the network transceiver, an indication that the communication unit has completed the transmit session.

2. A communication controller comprising:

a network transceiver; and a processor adapted to receive, from local network equipment using the network transceiver, a request for the communication controller to page a communication unit, wherein the communication unit is targeted by a local service request, adapted to send, to the local network equipment using the network transceiver, an indication that the communication unit is available, adapted to receive, from the local network equipment using the network transceiver, a request for the communication controller to initialize channel resources to support the local service request, adapted to receive, from the local network equipment using the network transceiver, an indication that a service originating unit has completed a transmit session, wherein the service originating unit is served by the local network equipment, adapted to receive, from the communication unit using the network transceiver, a request to talk, adapted to send, to the local network equipment using the network transceiver, an indication that the communication unit has requested to talk, adapted to receive, from the local network equipment using the network transceiver, an indication that the communication unit is granted talk privileges for a transmit session, adapted to receive, using the network transceiver, an indication that the communication unit has completed a transmit session, and adapted to send, to the local network equipment using the network transceiver, an indication that the communication unit has completed the transmit session.

3. A method for interurban dispatch private calling comprising:

receiving, by local network equipment, a service request targeting a communication unit served by remote network equipment, wherein the service request is received from an originating unit served by the local network equipment;

sending, by the local network equipment, a request for the remote network equipment to page the communication unit;

receiving, by the local network equipment from the remote network equipment, an indication that the communication unit is available;

sending, by the local network equipment, a request for the remote network equipment to initialize channel resources to support the service request;

receiving, by local network equipment, an indication that the originating unit has completed a transmit session;

sending, by the local network equipment to the remote network equipment, an indication that the originating unit has completed the transmit session;

receiving, by the local network equipment from the remote network equipment, an indication that the communication unit has requested to talk;

sending, by the local network equipment to the remote network equipment, an indication that the communication unit is granted talk privileges for a transmit session; and receiving, by the local network equipment from the remote network equipment, an indication that the communication unit has completed the transmit session.

4. The method of claim 3, wherein the service request comprises a dispatch private call request.

5. The method of claim 3, wherein the local network equipment and the remote network equipment each comprise communication controllers, wherein the local network equipment and the remote network equipment each comprise dispatch communication controllers, and wherein the local network equipment is part of a first urban area and the remote network equipment is part of a second urban area.

6. The method of claim 3 further comprising:
transmitting, by the local network equipment, a routing request message to a home location register; and
receiving, by the local network equipment, a response to the routing request message that identifies the remote network equipment as serving the communication unit.

7. The method of claim 3 further comprising:
receiving, by the local network equipment from the remote network equipment, an indication that channel resources required to support the service request are available to the remote network equipment.

8. The method of claim 7, wherein receiving the indication that channel resources are available further comprises:
receiving, by the local network equipment from the remote network equipment, an indication of a bearer gateway in the remote network equipment to support the service request.

9. The method of claim 3, wherein sending the request to page the communication unit further comprises:
sending, by the local network equipment to the remote network equipment, an indication of a bearer gateway in the local network equipment to support the service request.

10. The method of claim 3 further comprising:
sending, by the local network equipment to the remote network equipment, an indication of a present local call state; and
receiving, by the local network equipment from the remote network equipment, an indication that a present remote call state is synchronized with the present local call state.

11. The method of claim 3 further comprising:
determining, by the local network equipment, whether talk privileges remain unassigned.

12. The method of claim 3 further comprising:
sending, by the local network equipment to the remote network equipment, an indication to terminate support of the service request.

13. The method of claim 3 further comprising:
receiving, by local network equipment, a dispatch call alert request targeting a call alert unit served by remote network equipment, wherein the dispatch call alert request is received from a call alert originating unit served by the local network equipment; and
sending, by the local network equipment, a request for the remote network equipment to page the call alert unit with a call alert from the call alert originating unit.

14. A method for interurban dispatch private calling comprising:
receiving, by remote network equipment from local network equipment, a request for the remote network equipment to page a communication unit, wherein the communication unit is targeted by a local service request;
sending, by the remote network equipment to the local network equipment, an indication that the communication unit is available;
receiving, from the local network equipment, a request for the remote network equipment to initialize channel resources to support the local service request;
receiving, by the remote network equipment from the local network equipment, an indication that a service originating unit has completed a transmit session, wherein the service originating unit is served by the local network equipment;
receiving, by the remote network equipment from the communication unit, a request to talk;

sending, by the remote network equipment to the local network equipment, an indication that the communication unit has requested to talk;
receiving, by the remote network equipment from the local network equipment, an indication that the communication unit is granted talk privileges for a transmit session;
receiving, by the remote network equipment, an indication that the communication unit has completed a transmit session; and
sending, by the remote network equipment to the local network equipment, an indication that the communication unit has completed the transmit session.

15. The method of claim 14 further comprising:
sending, by the remote network equipment to the communication unit, an indication that the service originating unit has completed the transmit session.

16. The method of claim 14 further comprising:
paging, by the remote network equipment, the communication unit.

17. The method of claim 14 further comprising:
sending, by the remote network equipment to the local network equipment, an indication that channel resources required to support the local service request are available to the remote network equipment.

18. The method of claim 17, wherein sending the indication that channel resources are available further comprises:
sending, by the remote network equipment to the local network equipment, an indication of a bearer gateway in the remote network equipment to support the local service request.

19. The method of claim 14, wherein receiving the request to page the communication unit comprises:
receiving, by the remote network equipment from the local network equipment, an indication of a bearer gateway in the local network equipment to support the local service request.

20. The method of claim 14 further comprising:
sending, by the remote network equipment to the local network equipment, an indication to terminate support of the local service request.

21. The method of claim 14 further comprising:
receiving, by the remote network equipment from the local network equipment, an indication of a present local call state;
comparing, by the remote network equipment the present remote call state and the present local call state; and
sending, by the remote network equipment to the local network equipment, an indication that a present remote call state is synchronized with the present local call state.

22. The method of claim 14 further comprising:
receiving, by the remote network equipment from the local network equipment, a request for the remote network equipment to page a call alert unit with a call alert from a call alert originating unit; and
paging, by the remote network equipment, the call alert unit with a call alert from the call alert originating unit.

23. The method of claim 22 further comprising:
sending, by remote network equipment to local network equipment, a response to the request to page a call alert unit with a call alert.

* * * * *